United States Patent
Togawa et al.

(10) Patent No.: US 6,873,448 B2
(45) Date of Patent: Mar. 29, 2005

(54) OPTICAL PATH SWITCHING APPARATUS

(75) Inventors: Masayuki Togawa, Kanagawa (JP); Morio Kobayashi, Kanagawa (JP)

(73) Assignee: Teijin Seiki Co., Ltd., Tokyo (JP)

( * ) Notice: Subject to any disclaimer, the term of this patent is extended or adjusted under 35 U.S.C. 154(b) by 0 days.

(21) Appl. No.: 10/376,340

(22) Filed: Mar. 3, 2003

(65) Prior Publication Data

US 2003/0169477 A1 Sep. 11, 2003

(30) Foreign Application Priority Data

Mar. 11, 2002 (JP) ........................................ 2002-065563

(51) Int. Cl.⁷ ............................ G02B 26/08; G02B 6/26
(52) U.S. Cl. ........................ 359/226; 359/198; 359/204; 359/205; 359/212; 359/298; 385/16; 385/17; 385/18
(58) Field of Search ................................. 359/223–226, 359/198, 204, 205, 212, 298; 385/16–18

(56) References Cited

U.S. PATENT DOCUMENTS

| | | | | |
|---|---|---|---|---|
| 4,705,349 A | * | 11/1987 | Reedy ........................... | 385/22 |
| 5,436,986 A | * | 7/1995 | Tsai .............................. | 385/16 |
| 6,208,777 B1 | * | 3/2001 | Jing .............................. | 385/16 |
| 6,396,976 B1 | * | 5/2002 | Little et al. .................... | 385/18 |
| 6,430,333 B1 | * | 8/2002 | Little et al. .................... | 385/18 |
| 6,453,083 B1 | * | 9/2002 | Husain et al. ................. | 385/17 |
| 6,526,196 B1 | * | 2/2003 | Li .................................. | 385/18 |
| 6,563,975 B2 | * | 5/2003 | Towery ......................... | 385/18 |
| 6,574,384 B1 | * | 6/2003 | Cannell et al. ................ | 385/16 |
| 6,587,614 B2 | * | 7/2003 | Liao et al. ..................... | 385/18 |
| 2002/0003919 A1 | * | 1/2002 | Morimoto ...................... | 385/18 |
| 2002/0021859 A1 | * | 2/2002 | Briggs ........................... | 385/17 |
| 2003/0063841 A1 | * | 4/2003 | Shiozawa et al. ............. | 385/18 |
| 2003/0206682 A1 | * | 11/2003 | Guynn et al. .................. | 385/16 |

* cited by examiner

Primary Examiner—Evelyn A. Lester
(74) Attorney, Agent, or Firm—Venable LLP; Andrew C. Aitken

(57) ABSTRACT

Each of light beam switching elements disposed between input and output fiber collimators includes a support member, a first reflection member mounted on the peripheral portion of the support member and a second reflection member mounted on the peripheral portion of the support member. The first reflection member has a first reflection mirror surface to reflect the light beam from the input fiber collimator, and the second reflection member has a second reflection mirror surface to reflect the light beam reflected by the first reflection mirror surface. A drive actuator allows each of the switching elements to assume a first rotation position in which the light beam from the input fiber collimator is reflected by the first and second mirror surfaces, and a second rotation position in which the light beam from the input fiber collimator passes between the first and second reflection members without being reflected by the mirror surfaces.

7 Claims, 13 Drawing Sheets

OPTICAL PATH SWITCHING APPARATUS

BACKGROUND OF INVENTION

1. Field of the Invention

The present invention relates to an optical path switching apparatus comprising a plurality of input and output fiber collimators in which the optical paths of the light beams from the input fiber collimators are selectively switched to the optical paths of the light beams of the output fiber collimators.

2. Description of Related Art

Up until now, there have been proposed a wide variety of optical path switching apparatus one typical example of which is shown in FIGS. 10 and 11 to bear a reference numeral 900. The optical path switching apparatus 900 comprises an input fiber collimator array 910 including a plurality of input fiber collimators 910a, 910b, 910c and 910d disposed in spaced and parallel relationship with one another to have a plurality of light beams 901, 902, 903 and 904 pass therethrough. The input fiber collimator 910a has an optical fiber 911a and a lens 912a connected to the front end of the optical fiber 911a to form in combination an input port 913a. The input fiber collimators 910b, 910c and 910d are the same in construction as the input fiber collimator 910a previously mentioned. The input fiber collimators 910a, 910b, 910c and 910d respectively serve to introduce the light beams 901, 902, 903 and 904 from the external of the optical path switching apparatus to the internal of the optical path switching apparatus. The optical path switching apparatus further comprises a retaining member 914 designed to retain the input fiber collimators 910a, 910b, 910c and 910d in such a manner that the light beam axes of the optical paths formed by the input fiber collimators 910a, 910b, 910c and 910d are held in spaced and parallel relationship with one another.

On the other hand, the conventional optical path switching apparatus further comprises an output fiber collimator array 920 similar in construction to the input fiber collimator array 910 and thus including a plurality of output fiber collimators 920a, 920b, 920c and 920d disposed in spaced and parallel relationship with one another to have a plurality of light beams 901, 902, 903 and 904 pass therethrough. The output fiber collimator 920a has an optical fiber 921a and a lens 922a connected to the rear end of the optical fiber 921a to form in combination an output port 923a. The output fiber collimators 920b, 920c and 920d are the same in construction as the output fiber collimator 920a. The output fiber collimators 920a, 920b, 920c and 920d respectively serve to discharge the light beams 901, 902, 903 and 904 from the internal of the optical path switching apparatus to the external of the optical path switching apparatus. The optical path switching apparatus further comprises a retaining member 924 designed to retain the output fiber collimators 920a, 920b, 920c and 920d in such a manner that the light beam axes of the optical paths formed by the output fiber collimators 920a, 920b, 920c and 920d are held in spaced and parallel relationship with one another and in perpendicular relationship with the input fiber collimators 910a, 910b, 910c and 910d. The optical path switching apparatus exemplified in FIG. 10 has four input ports 913a and four output ports 923a combined to form light beam paths numbering 4 by 4.

The optical path switching apparatus further comprises an light beam switching array 930 including a plurality of light beam switching elements 931 numbering sixteen shown for example in FIG. 10 and adapted to reflect the light beams from the optical paths of the input fiber collimators 910a, 910b, 910c and 910d to the optical paths of the output fiber collimators 920a, 920b, 920c and 920d. The light beam switching elements 931 are disposed at the respective junctions of the optical paths of the input fiber collimators 910a, 910b, 910c and 910d and the optical paths of the output fiber collimators 920a, 920b, 920c and 920d to be driven to rotate around their own axes to selectively switch the optical paths of the input fiber collimators 910a, 910b, 910c and 910d to the optical paths of the output fiber collimators 920a, 920b, 920c and 920d.

The optical path switching apparatus further comprises an actuator array 940 including a plurality of drive actuators 941 numbering sixteen shown for example in FIG. 10 and having a rotation shaft 942 for driving to rotate the light beam switching elements 931. In FIG. 11, however, is shown only four drive actuators 941.

The construction of the light beam switching elements 931 will be described hereinafter in more detail.

The light beam switching element 931 shown in FIG. 11 is disposed at the junction of the optical path of the input fiber collimator 910a and the optical path of the output fiber collimator 920b and has a support plate 932 fixedly connected with the rotation shaft 942 of the drive actuator 941 so that the light beam switching element 931 can be driven to rotate around its own center axis. The light beam switching element 931 is shown in FIGS. 12 and 13 as comprising a reflection mirror 933 securely mounted on the peripheral surface of the support plate 932 and having a reflection mirror surface 933a designed to reflect the light beam 901 from the optical path of the input fiber collimator 910a, and a reflection mirror 934 also securely mounted on the peripheral surface of the support plate 932 and having a reflection mirror surface 934a also designed to reflect the light beam 901 reflected by the reflection mirror surface 933a to the optical path of the output fiber collimator 920b along the light beam switching element 936 at an angle 901a of 90 degrees under the influence of an angle 935 of 45 degrees between the reflection mirrors 933 and 934.

As will be seen from the foregoing description, the drive actuators 941 of the drive actuator array 940 are operative to assume two different states consisting of respective reflection states and respective non-reflection states. In the reflection states, the drive actuators 941 are operated to have the support plate 932 rotated and thereby to have the reflection mirrors 933 and 934 positioned to enable the light beams to be reflected by the reflection mirror surfaces 933a and the reflection mirror surface 934a to selectively switch the optical paths of the input fiber collimators 910a, 910b, 910c and 910d to the optical paths of the output fiber collimators 920a, 920b, 920c. In the non-reflection states, on the other hand, the drive actuators 941 are not operated to have the rotation shafts 932 rotated and thereby not to have the reflection mirrors 933 and 934 positioned not to enable the light beams to be reflected by the reflection mirror surfaces 933a and the reflection mirror surface 934a. This means that the optical paths of the input fiber collimators 910a, 910b, 910c and 910d cannot be selectively switch to the optical paths of the output fiber collimators 920a, 920b, 920c.

The respective mirror surfaces 933a and 934a of the reflection mirrors 933 and 934 on the peripheral surface of the support plate 932 are angled at about 45 degrees so that the optical path of the input fiber collimator 910a can be changed in direction at an angle 935 of about 90 degrees with respect to the optical path of the output fiber collimator

920b. The foregoing description has been made only regarding the light beam switching element 931 with reference to FIGS. 12 and 13, however, the remaining light beam switching elements constituting the light beam switching array 930 are completely the same in construction as the light beam switching element 931.

The conventional optical path switching apparatus encounters such a problem that the support plates are required to be arranged with a sufficient space between the neighboring support plates to prevent the reflection mirrors from being held in contact with one another. The sufficient space of the neighboring support plates thus required makes it inevitable for an optical path switching apparatus to become relatively large in a size.

SUMMARY OF THE INVENTION

It is, therefore, an object of the present invention to provide an optical path switching apparatus, which is small in size as compared with the conventional optical path switching apparatus by reducing the space between the neighboring rotation shafts required for the conventional optical path switching apparatus.

According to the first aspect of the present invention, there is provided an optical path switching apparatus which comprises: an input fiber collimator for allowing a light beam to pass therethrough; a plurality of output fiber collimators for respectively allowing the light beams to pass therethrough, and a plurality of light beam switching elements respectively disposed between the input fiber collimator and the output fiber collimators to selectively switch the light beam from the input fiber collimator to the output fiber collimators, each of the light beam switching elements including a support member having a rotation axis, a peripheral surface, and an extension plane extending from the peripheral surface in parallel relationship with the rotation axis, and a first reflection member securely mounted on the peripheral portion of the support plate within the extension plane of the support member, and a second reflection member securely mounted on the peripheral portion of the support plate within the extension plane of the support member, the first reflection member having a first reflection mirror surface designed to reflect the light beam from the input fiber collimator, the second reflection member having a second reflection mirror surface designed to reflect to the output fiber collimator the light beam reflected by the first reflection mirror surface of the first reflection member, and a drive actuator for respectively driving the support members to allow the support members each to assume two different rotation positions including a first rotation position in which the light beam from the input fiber collimator is reflected by the first and second mirror surfaces of the first and second reflection members, and a second rotation position in which the light beam from the input fiber collimator passes between the first and second reflection members without being reflected by the first and second mirror surfaces of the first and second reflection members.

The light beam discharged from the input fiber collimator has a center axis, and the light beam inputted into one of the output fiber collimators has a center axis, the center axis of the light beam discharged from the input fiber collimator and the center axis of the light beam inputted into one of the output fiber collimators being substantially at an angle of 90 degrees with respect to each other.

The light beam discharged from the input fiber collimator has a center axis, and the light beam inputted into one of the output fiber collimators has a center axis, the center axis of the light beam discharged from the input fiber collimator and the center axis of the light beam inputted into one of the output fiber collimators being substantially in parallel relationship to each other.

According to the second aspect of the present invention, there is provided a plurality of input fiber collimators for respectively allowing light beams to pass therethrough; a plurality of output fiber collimators for respectively allowing the light beams to pass therethrough, and a plurality of light beam switching elements respectively disposed between the input fiber collimators and the output fiber collimators to selectively switch the light beams from the input fiber collimators to the output fiber collimators, each of the light beam switching elements including a support member having a rotation axis, a peripheral surface, and an extension plane extending from the peripheral surface in parallel relationship with the rotation axis, and a first reflection member securely mounted on the peripheral portion of the support plate within the extension plane of the support member, and a second reflection member securely mounted on the peripheral portion of the support plate within the extension plane of the support member, the first reflection member having a first reflection mirror surface designed to reflect the light beam from the input fiber collimator, the second reflection member having a second reflection mirror surface designed to reflect to the output fiber collimator the light beam reflected by the first reflection mirror surface of the first reflection member, and a drive actuator for respectively driving the support members to allow the support members each to assume two different rotation positions including a first rotation position in which the light beam from the input fiber collimator is reflected by the first and second mirror surfaces of the first and second reflection members, and a second rotation position in which the light beam from the input fiber collimator passes between the first and second reflection members without being reflected by the first and second mirror surfaces of the first and second reflection members.

The light beams discharged from the input fiber collimators respectively have center axes, and the light beams inputted into the output fiber collimators respectively have center axes, the center axes of the light beams discharged from the input fiber collimators and inputted into the output fiber collimators being substantially at an angle of 90 degrees with respect to each other.

The first reflection mirror surface of the first reflection member and the second reflection mirror surface of the second reflection member are substantially at an angle of 45 degrees.

BRIEF DESCRIPTION OF THE DRAWINGS

The objects, features and advantages of the present invention will become apparent as the description proceeds when taken in conjunction with the accompanying drawings, in which.

DESCRIPTION OF THE PREFERRED EMBODIMENTS

The first embodiment of the optical path switching apparatus according to the present invention will be described hereinafter.

Figure 1:
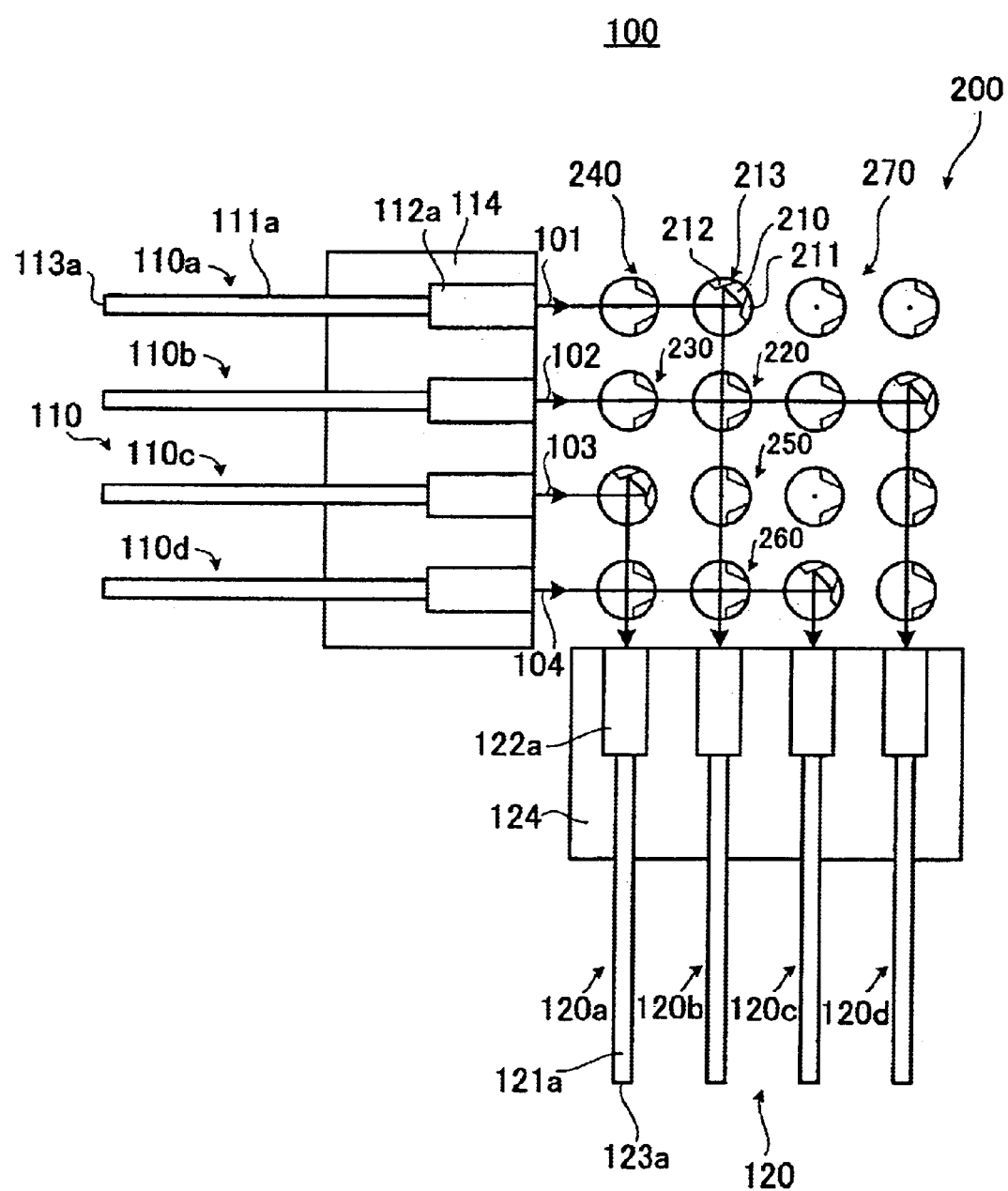
FIG. 1 is a plan view of a first embodiment of an optical path switching apparatus according to the present invention.
Figure 2:
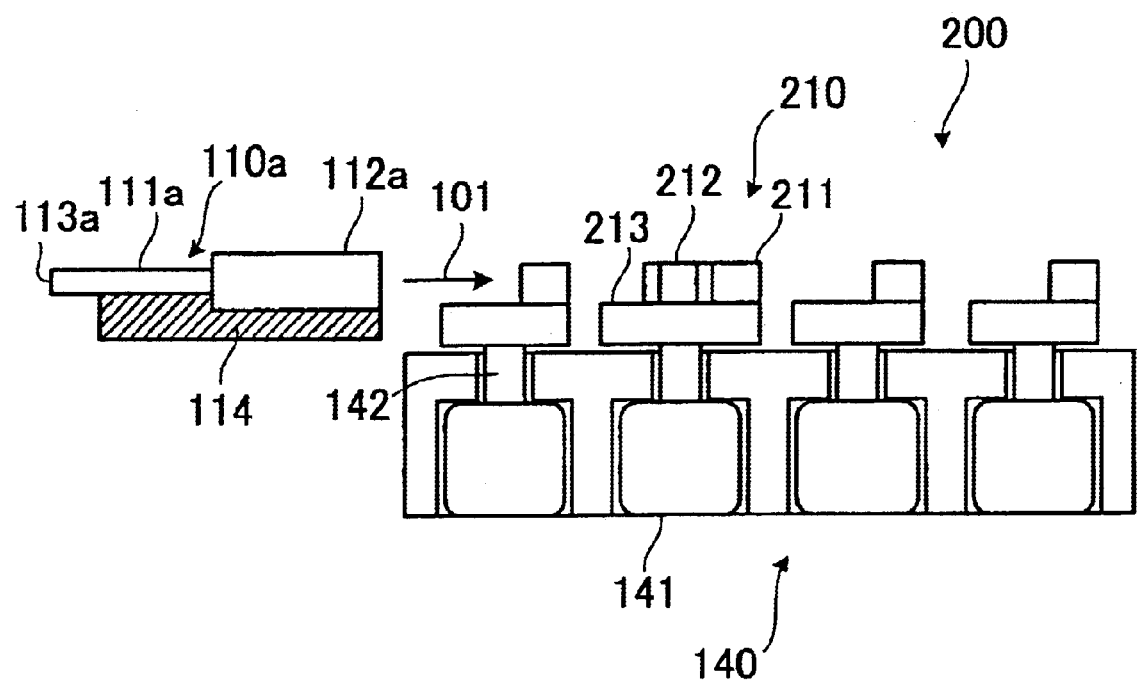
FIG. 2 is an elevation view of a first embodiment of the optical path switching apparatus according to the present invention.

The optical path switching apparatus is shown to bear a reference numeral 100 in FIGS. 1 and 2 and comprises an input fiber collimator array 110 including a plurality of input fiber collimators 110a, 110b, 110c and 110d disposed in spaced and parallel relationship with one another to have a plurality of light beams 101, 102, 103 and 104 respectively pass therethrough. The input fiber collimator 110a has an optical fiber 111a and a lens 112a connected to the front end of the optical fiber 111a to form in combination an input port 113a. The input fiber collimators 110b, 110c and 110d are the same in construction as the input fiber collimator 110a previously mentioned. The input fiber collimators 110a, 110b, 110c and 110d respectively serve to introduce the light beams 101, 102, 103 and 104 from the external of the optical path switching apparatus to the internal of the optical path switching apparatus. The optical path switching apparatus further comprises a retaining member 114 designed to retain the input fiber collimators 110a, 110b, 110c and 110d in such a manner that the light beam axes of the optical paths formed by the input fiber collimators 110a, 110b, 110c and 110d are held in spaced and parallel relationship with one another.

On the other hand, the optical path switching apparatus further comprises an output fiber collimator array 120 similar in construction to the input fiber collimator array 110 and thus including a plurality of output fiber collimators 120a, 120b, 120c and 120d disposed in spaced and parallel relationship with one another to have a plurality of light beams 101, 102, 103 and 104 respectively pass therethrough. The output fiber collimator 120a has an optical fiber 121a and a lens 122a connected to the rear end of the optical fiber 121a to form in combination an output port 123a. The output fiber collimators 120b, 120c and 120d are the same in construction as the output fiber collimator 120a. The output fiber collimators 120a, 120b, 120c and 120d respectively serve to discharge the light beams 101, 102, 103 and 104 from the internal of the optical path switching apparatus to the external of the optical path switching apparatus. The optical path switching apparatus further comprises a retaining member 124 designed to retain the output fiber collimators 120a, 120b, 120c and 120d in such a manner that the light beam axes of the optical paths formed by the output fiber collimators 120a, 120b, 120c and 120d are held in spaced and parallel relationship with one another and in perpendicular relationship with the input fiber collimators 110a, 110b, 110c and 110d.

The optical path switching apparatus 100 exemplified in FIG. 1 has four input ports and four output ports combined to form light beam paths numbering 4 by 4.

Here, the lenses used for the input fiber collimators 110a, 110b, 110c and 110d and the output fiber collimators 120a, 120b, 120c and 120d are each made of a spherical lens, a drum lens, a GRIN lens having a reflection ratio variable in response to a location where the lens is arranged, or other lenses which can each perform a lens function.

The optical path switching apparatus further comprises a light beam switching array 200 including a plurality of light beam switching elements 210, 220, 230 and 240 numbering sixteen shown for example in FIG. 1.

The optical path switching apparatus further comprises an actuator array 140 including a plurality of drive actuators 141 numbering sixteen shown for example in FIG. 1 and having respective rotation shafts 142 for driving to rotate the light beam switching elements 210, 220, 230 and 240, respectively. In FIG. 1, however, is shown only four drive actuators 141. Each of the drive actuator 141 of the actuator array 140 may be constituted by an electromagnetic motor type of actuator driven by an electromagnetic motor, a static motor type of actuator, and other actuator which can generate a driving force to the rotation shaft 142.

The light beam switching elements 210, 220, 230 and 240 will be described hereinafter in more detail.

The light beam switching elements 210, 220, 230 and 240 are disposed at the respective junctions of the optical paths of the input fiber collimators 110a, 110b, 110c and 110d and the optical paths of the output fiber collimators 120a, 120b, 120c and 120d to be driven to rotate around their own axes selectively to reflect the light beams from the optical paths of the input fiber collimators 110a, 100b, 110c and 110d to the optical paths of the output fiber collimators 120a, 120b, 120c and 120d so that the light beam switching elements 120 can serve to switch and not to switch the optical paths of the input fiber collimators 110a, 110b, 110c and 110d to the optical paths of the output fiber collimators 120a, 120b, 120c and 120d.

The following description will be directed to only one light beam switching element 210 with reference to FIGS. 1 to 5.

As will be seen from FIGS. 1 to 5, the light beam switching element 210 is disposed at the junction of the optical path of the input fiber collimator 110a and the optical path of the output fiber collimator 120b.

The light beam switching element 210 comprises a support plate 213 in the form of a disc shape and fixedly supported by and in axial alignment with the rotation shaft 142 of the drive actuator 141 to be rotatable around its own center axis 213a, first reflection member 211 securely mounted on the peripheral portion of the support plate 213 and having a reflection mirror surface 211a designed to reflect the light beam 101 from the optical path of the input fiber collimator 110a, and a second reflection member 212 also securely mounted on the peripheral portion of the support plate 213 and having a reflection mirror surface 212a also designed to reflect to the optical path of the output fiber collimator 120b the light beam 101 reflected by the reflection mirror surface 211a and 212a. The locations of the first and second reflection members 211 and 212 are such that the reflection mirror surfaces 211a and 212a are on a horizontal plane having the light beam 101 pass thereon, viz., on the optical path of the light beam 101 from the input fiber collimator 110a to the output fiber collimator 120b, and thus can reflect the light beam 101 from the input fiber collimator 110a to the output fiber collimator 120b. The support plate 213 is positioned in spaced relationship with the horizontal plane having the light beam 101 pass thereon and thus can allow the light beam 101 to pass from the input fiber collimator 110a to the output fiber collimator 120b.

The support plate 213 has an outer peripheral surface 213b, and an imaginary outer extension face 213c extending axially outwardly from the outer peripheral surface 213b. The imaginary outer extension face 213c is illustrated in phantom lines in FIG. 5.

Figure 3:
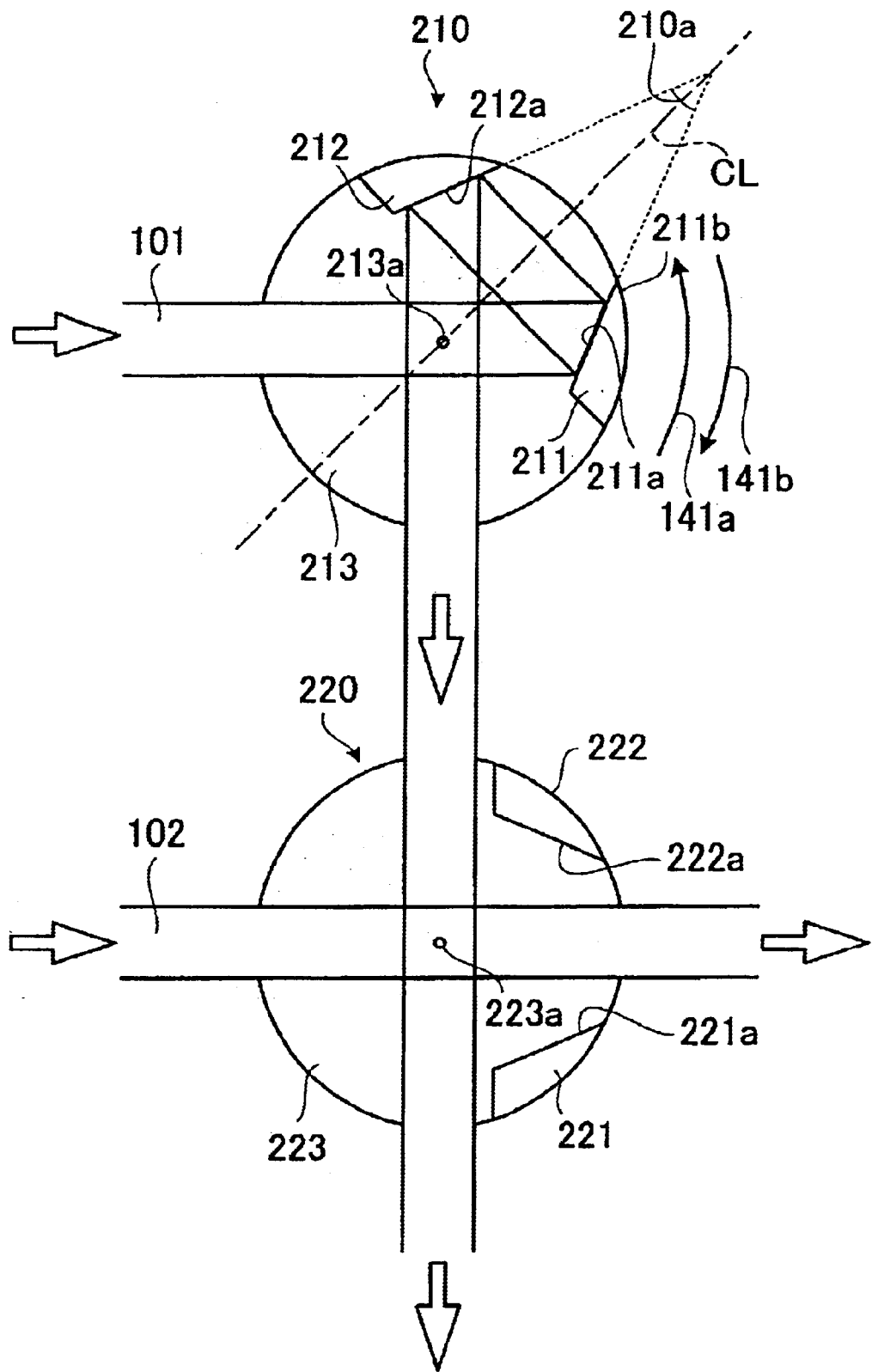
FIG. 3 is an enlarged plan view of two light beam switching elements forming part of the optical path switching apparatus according to the present invention and showing how light beams are reflected by the light beam switching elements.

The first and second reflection members 211 and 212 have respective outer surfaces 211b and 212b and are disposed on the support plate 213 with the outer surfaces 211b and 212b of the first and second reflection members 211 and 212 being within the imaginary outer extension face 213c of the support plate 213 and in symmetrical relationship with each other with respect to the center line "CL" (see FIG. 3) passing through the center axis 213a of the support plate 213. The first reflection mirror surface 211a of the first reflection member 211 and the second reflection mirror surface 212a of the second reflection member 212 are substantially at an angle 210a of 45 degrees as best shown in FIG. 3. The light beams 101, 102, 103 and 104 discharged from the input fiber collimators 110a, 110b, 110c and 110d respectively have center axes, and the light beams 101, 102, 103 and 104 inputted into the output fiber collimators 120a, 120b, 120c and 120d respectively have center axes, the center axes of the light beams 101, 102, 103 and 104 discharged from the input fiber collimators 110a, 110b, 110c and 110d and inputted into the output fiber collimators 120a, 120b, 120c and 120d being substantially at an angle of 90 degrees with respect to each other as best shown in FIG. 1.

The fact that the outer surfaces 211b and 212b of the first and second reflection members 211 and 212 is within the imaginary outer extension face 213c of the support plate 213 leads to the fact that the first and second reflection members 211 and 212 are not projected radially outwardly from the imaginary outer extension face 213c of the support plate 213, thereby making it possible to position the support plate 213 and the light beam switching element 210 in a relatively small space and in close proximity of one another while the first and second reflection members 211 and 212 are prevented from being brought into contact with one another when the support plate 213 is rotated. It will therefore be understood that the overall size of the optical path switching apparatus can be small together with the input and output fiber collimators being easy to be disposed also in close proximity of one another.

The reflection mirror surfaces 211a and 212a of the first and second reflection members 211 and 212 are in spaced and opposing relationship with each other at an angle, 210a of about 45 degrees so that the optical path of the input fiber collimator 110a is angled at about 90 degrees with respect to the optical path of the output fiber collimator 120b. This leads to the fact that the light beam 101 from the optical path of the input fiber collimator 110a can be reflected at an angle of about 90 degrees to the optical path of the output fiber collimator 120b by the respective mirror surfaces 211a and 212a of the first and second reflection members 211 and 212.

The drive actuator 141 forming part of the drive actuator array 140 are operative to have the support plate 213 to assume two different angular positions consisting of a reflection position and non-reflection position. When the support plate 213 of the light beam switching element 210 is rotated to assume the reflection position as shown in the upper half of FIG. 3, under the condition that the support plate 223 of the light beam switching element 220 is held to assume the non-reflection position with as shown in the lower half of FIG. 3, the first and second reflection members 211 and 212 are positioned to allow the light beams 101 to be reflected by the reflection mirror surfaces 211a and 212a while the first and second reflection members 221 and 222 are positioned to allow the light beams 101 reflected by the reflection mirror surfaces 211a and 212a to pass along the first and second reflection members 221 and 222 without being reflected by the reflection mirror surfaces 221a and 222a of the first and second reflection members 221 and 222. When, one the other hand, the support plate 223 of the light beam switching element 220 is held to assume the non-reflection position with as shown in the lower half of FIG. 3, the light bean 102 discharged by the input fiber collimator 110b is allowed by the first and second reflection members 221 and 222 to pass on the support plate 223 between the reflection mirror surfaces 221a and 222a without being reflected by the reflection mirror surfaces 221a and 222a.

Before designing the light beam switching element 210 and 220 shown in FIG. 3, the following consideration is required to be paid.

Figure 6:
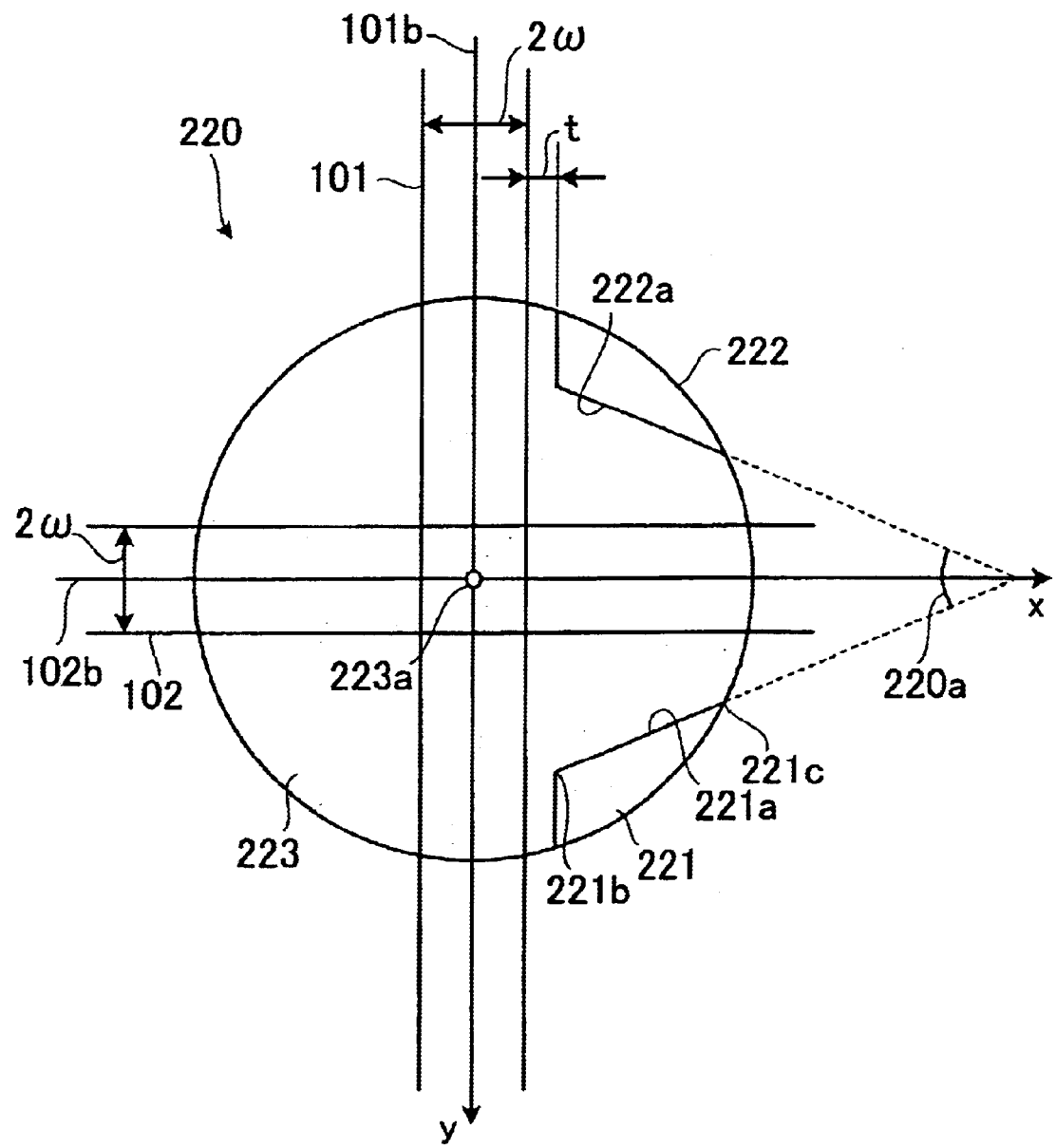
FIG. 6 is an enlarged plan view of two light beam switching elements forming part of the optical path switching apparatus according to the present invention and showing an acute angle between the mirror surfaces of the first and second reflection members.

In FIG. 6, the light beam axis 101b of the light beam 101 and the light beam axis 102b of the light beam 102 are assumed to be an x-axis and a y-axis, respectively, with the light beam directions being positive since the light beam 101 is in perpendicular relationship with the light beam 102 while the center axis 223a is assumed to be the origin (0, 0).

The diameters of the light beams 101 and 102 are assumed to be 2ω while the gap between the end of the light beam 101 and the end faces of the reflection members 221 and 222 is assumed to be "t". The reflection member 221 has a first end point 221b represented by a coordinate (u, v) and a second end point 221c indicated by a coordinate (m, n). The angle 220a between the mirror surfaces 221a and 222a of the first and second reflection members 221 and 222 is assumed to be 45 degrees as best shown in FIG. 6. The coordinates (u, v) and (m, n) are given by the following equation.

$$u=\omega+t$$

$$v=(1+\sqrt{2})\times(\omega+t)$$

$$m=3(\omega+t)$$

$$n=(1+\sqrt{2}-2\tan 22.5°)\times(\omega+t)$$

The first reflection member 221 is preferably designed to be in symmetrical relationship with the second reflection member 222 with respect to the light beam axis 102b of the light beam 102.

If the second end point 221c, i.e., the coordinate (m, n) of the first reflection member 221 is obtained, the diameter "L" of the support plate 223 are given by the following equation.

$$L=2\sqrt{(m^2+n^2)}$$

While the previous description has been directed to the light beam switching elements 210 and 220, there will be no following description about all of the light beam switching elements of the light beam switching array 200 because the remaining light beam switching elements are the same in construction as the light beam switching elements 221 and 222.

The foregoing description has been made only regarding the light beam switching elements 210 and 220 with reference to FIGS. 1 to 5, however, the remaining light beam switching elements constituting the light beam switching array 200 are completely the same in construction as the light beam switching elements 210 and 220 and will therefore not be described hereinafter.

As will be understood from the foregoing description, the repeated operations of the drive actuators 141 of the drive actuator arrays 140 cause all of the support plates forming the light beam switching elements 220, 230 and 240 to be rotated to assume the respective reflection and non reflection positions so that the optical paths of the input fiber collimators 110a, 110b, 110c and 110d can be selectively switched to the optical paths of the output fiber collimators 120a, 120b, 120c.

Figure 7:
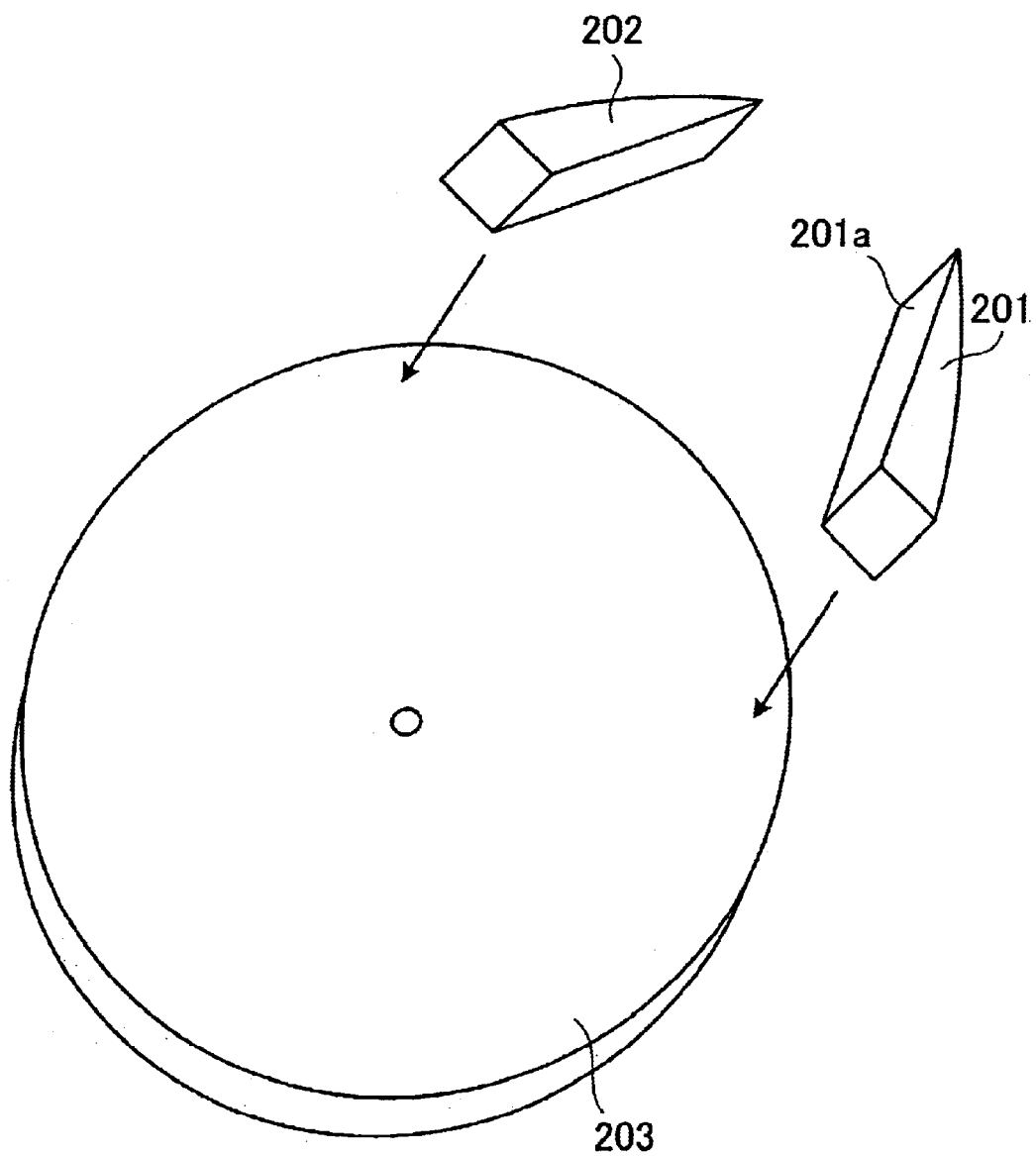
FIG. 7 is an enlarged perspective view of the support plate, the first reflection member, and the second reflection member and showing how the first and second reflection members are securely mounted on the peripheral portion of the support plate.

The method of producing the light beam switching array 200 according to the first embodiment of the optical path switching apparatus will be described hereinafter with reference to FIG. 7.

The production process of the light beam switching array 200 comprises a first step of producing a chip 201 constituting the first reflection member, the chip 201 being made of a glass block cut and polished and formed with a reflection mirror surface 201a coated with a dielectric multiple-layer reflection film to enhance the reflection ratio of the mirror surface 201a. Here, the dielectric multiple-layer reflection film is obtained by superimposing a thin film of SiO2 or a thin film TiO2 multiple layers by a vacuum deposition method and a spattering method.

In order to enhance the reflection ratio of the reflection mirror surface 201a, the dielectric multiple-layer reflection film to be coated on the reflection mirror surface 201a may be replaced by a metal film and a silver film with a high reflection ratio and produced by a vacuum deposition method, a spattering method and (an electroplating method. Before the reflection mirror surface 201a of the chip 201 is coated with a metal film having a high reflection ratio, the metal film may in advance be reinforced in adhesion force by an undercoated film such as a Cr film coated on the surface of the metal film.

The chip 202 constituting the second reflection member is produced by a method similar to that of the chip 201 previously mentioned.

The support plate 203 is produced by cutting a glass block into a disk-like form.

The optical switch element is produced by preparing the chips 201, 202 and the support plate 203 for having the chips 201 and 202 adhered thereto by an adhering method using an optical adhesion material or by an adhering method using an anode conjunction.

The above description is directed to a glass block which is used as a base material to produce a support plate, however, the glass block may be replaced by a metal such a carbon steal and a stainless steal and other material which can be severed into the disc-like form. Similarly, the above description is directed to a glass block which is used as a base material to produce the chips 201 and 202, however, the glass block may be replaced by a metal such a carbon steal and a stainless steal and other material which can be used to form the reflection mirror surface.

While there has been described in the above about the fact that the first and second reflection members and the support plate are separately produced before the reflection members are adhered to the support plate, the first and second reflection members and the support plate may be prepared after being integrally formed in advance.

For example, using a metal mold enables a metal molding method to integrally form the first and second reflection members and the support plate before the reflection film is coated on the reflection mirror surface.

The metal molding method may be replaced by a press molding method with a die cast and a metal injection mold (MIG) used as a metal material to integrally form the first and second reflection members and the support plate before the reflection film is coated on the reflection mirror surface.

The operation of the first embodiment of the optical path switching apparatus according to the present invention will then be described hereinafter.

The optical path switching apparatus 100 is initially operated as shown in FIG. 1 to have the light beam switching elements selected from among the light beam switching elements and driven to be rotated by the drive actuator of the drive actuator array 140 (see FIG. 2) to assume the respective positions identical to the position of the light beam switching element 210 in the switching operation state as shown in FIG. 3 to selectively switch the optical paths of the light beams 101, 102, 103 and 104 from the input fiber collimators 110a, 110b, 110c and 110d.

On the other hand, the optical path switching apparatus 100 is initially operated as shown in FIG. 1 to have the remaining light beam switching elements selected from among the light beam switching elements and driven to be rotated by the drive actuator of the drive actuator array 140 (see FIG. 2) to assume the respective positions identical to the position of the light beam switching element 220 in the non-switching operation state as shown in FIG. 3 not to switch the optical paths of the light beams 101, 102, 103 and 104 from the input fiber collimators 110a, 110b, 110c and 110d before and after the remaining light beam switching elements are operated to switch the optical paths of the light beams from the other input fiver collimators.

For example, under the state that the light beam switching element 210 is held in the state shown in FIG. 3 after the optical path switching apparatus is operated to have the light beam switching element 210 assume the position where the optical path is switched by the light beam switching element 210, the light beam switching element 210 is rotated about 45 degrees around its rotation axis 213a in a rotation direction shown by an arrow 141a by the drive actuator 141 (see FIG. 2) to the state of the light beam switching element 210 shown in FIG. 3.

Under the state that the light beam switching element 210 is held in the state shown in FIG. 3 after the optical path switching apparatus is operated to have the light beam switching element 210 assume the position where the optical path is switched by the light beam switching element 210, the light beam switching element 220, 240, 250 and 260 are rotated around its rotation axis by the drive actuators of the drive actuator array 140 (see FIG. 2) to the state shown in FIG. 1.

Under these conditions, the light beam 101 is transmitted to the output fiber collimator 120b to be reflected by the reflection mirror surfaces 211a and 212a of the chips 211 212 of the optical switching element 210 after passing between the reflection mirror surfaces of the two chips forming part of the light beam switching element 240.

The optical switch element 210 is so constructed to enable the light beam 101 to be biased about 90 degrees even if the optical switch element 210 is rotated by the drive actuator 141 (see FIG. 2) to have the optical path not reflected at an accurate angle of 45 degrees.

On the other hand, under the state that the optical path switching apparatus 100 is operated as shown in FIG. 1 to have the remaining light beam switching elements selected from among the light beam switching elements and driven to be rotated by the drive actuator of the drive actuator array 140 (see FIG. 2) to assume the respective positions identical to the position of the light beam switching element 220 in the non-switching operation state as shown in FIG. 3 not to switch the optical paths of the light beams 101, 102, 103 and 104 from the input fiber collimators 110a, 110b, 110c and 110d,the light beam switching element 210 is rotated about 45 degrees around its rotation axis 213a in a rotation direction shown by an arrow 141b by the drive actuator 141 (see FIG. 2) to the state of the light beam switching element 220 shown in FIG. 3.

The rotation of the light beam switching element 210 causes the light beam 101 from the light beam switching element 240 passes between the reflection mirror surfaces 211a and 212a of the two chips 211 and 212 forming part of the light beam switching element 240 toward the optical switching element 270 with the light beam 101 being blocked by the chips 211 and 212 of the optical switching element 210.

From the foregoing description, it will be understood that the optical path switching apparatus 100 can operate the drive actuator of the drive actuator array 140 to have the light beam switching elements 131 rotated so that the optical paths of the light beams 101, 102, 103 and 104 from the input fiber collimators 110a, 110b, 110c and 110d can be selectively switched to the optical paths of the output fiber collimators 120a, 120b, 120c and 120d in such a manner that the input ports of the input fiber collimators 110a, 110b, 110c and 110d are selectively connected with the output ports of the output fiber collimators 120a, 120b, 120c and 120d.

The optical path switching apparatus 100 is so constructed to have the outer surfaces 211b and 212b of the first and second reflection members 211 and 212 within the imaginary outer extension face 213c of the support plate 213, thereby resulting in the fact that the first and second reflection members 211 and 212 are not projected radially outwardly from the imaginary outer extension face 213c of the support plate 213. This makes it possible to position the support plate 213 and the light beam switching element 210 in a relatively small space and in close proximity of one another while the first and second reflection members 211 and 212 is prevented from being brought into contact with one another when the support plate 213 is rotated. It will therefore be understood that the overall size of the optical path switching apparatus can be small together with the input and output fiber collimators being easy to be disposed also in close proximity of one another.

Although the foregoing description has been directed to the fact that the optical path switching apparatus comprises a plurality of input fiber collimators and a plurality of output fiber collimators, the optical path switching apparatus according to the present invention may comprise an input fiber collimator and a plurality of output fiber collimators to ensure that the light beam from said input fiber collimator is selectively switched to the output fiber collimators by the light beam switching elements.

The second embodiment of the optical path switching apparatus according to the present invention will be described hereinafter.

The construction of the second embodiment of the optical path switching apparatus is almost the same as that of the first embodiment of the optical path switching apparatus except for the constitution elements which will be described hereinafter, however, the construction elements of the second embodiment of the optical path switching apparatus the same as those of the first embodiment of the optical path switching apparatus bear the respective reference numerals the same as those of the first embodiment of the optical path switching apparatus and are omitted in description thereof.

Figure 8:
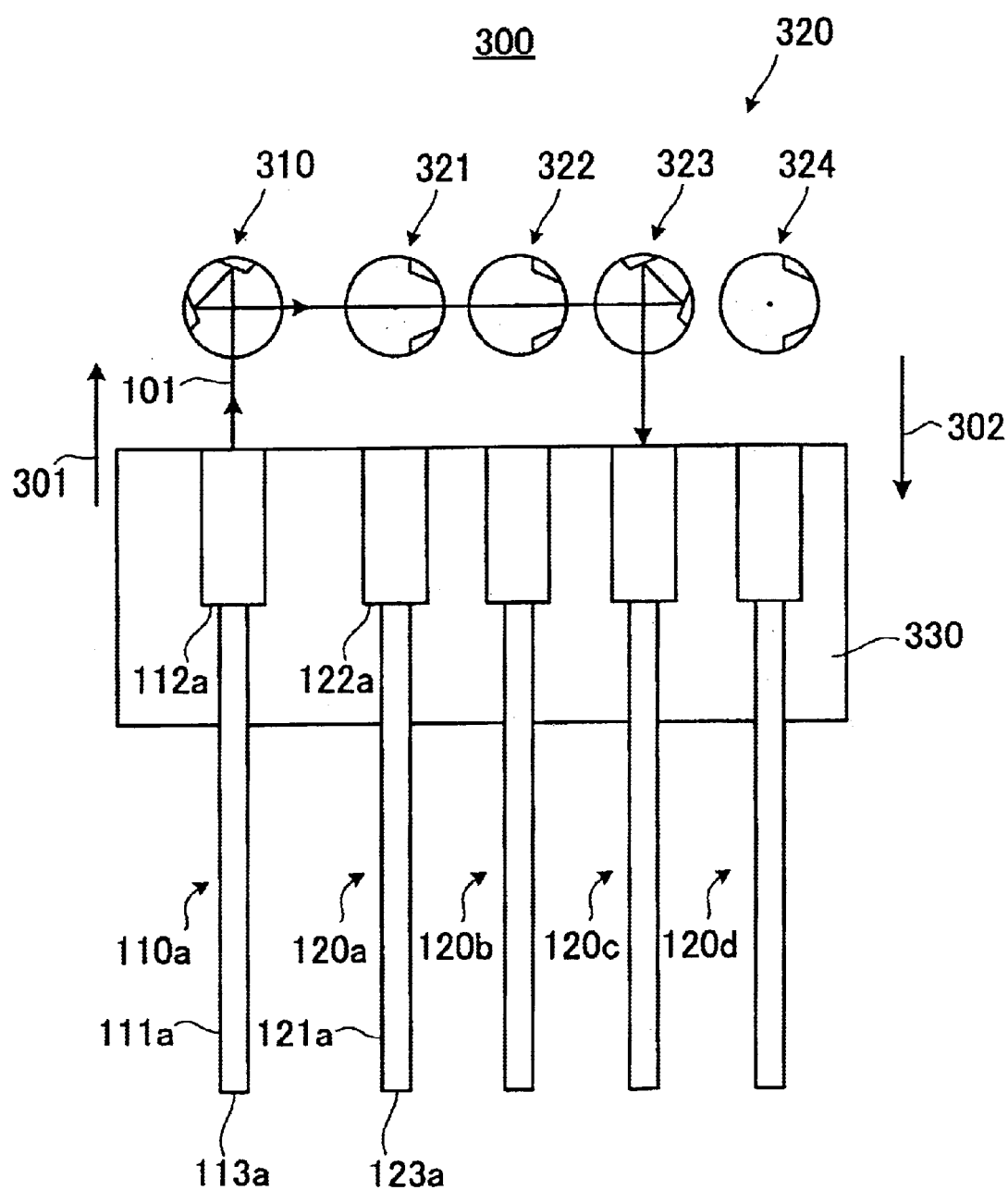
FIG. 8 is a plan view of a second embodiment of an optical path switching apparatus according to the present invention.

The optical path switching apparatus is shown to bear a reference numeral 300 in FIG. 8 comprises said input fiber collimator 110a and said output collimators 120a, 120b, 120c and 120d, the optical path switching apparatus 300 has one input port and four output ports combined to form light beam paths numbering 1 by 4. The optical path switching apparatus 300 is used for conducting an inspection on the function of an optical network.

The optical path switching apparatus 300 comprises light beam switching element 310 to reflect the light beam from the input fiber collimator 110a. The optical path switching apparatus 300 comprises light beam switching elements 321, 322, 323 and 324 to reflect the light beam reflected by light beam switching element 310.

The light beam 101 discharged by input fiber collimator 110a is reflected by the light beam switching element 310, and then is reflected by the light beam switching element 323 before being inputted to the output fiber collimator 120c.

While the forgoing description has been directed to the fact that the first embodiment of the optical path switching apparatus comprises a plurality of input fiber collimators and a plurality of output fiber collimators, the optical path switching apparatus according to the present invention may comprise an input fiber collimator and a plurality of output fiber collimators as shown in FIG. 8.

The second embodiment of the optical path switching apparatus is shown in FIG. 8 to bear a reference numeral 300 and comprises an input fiber collimator 110a having a light beam pass therethrough and having a front end from which the light beam is discharged to the outside thereof, and a plurality of output fiber collimators 120a, 120b, 120c and 120d having the light beams pass therethrough and having respective rear ends from which the light beams discharged from the input fiber collimator 110a are inputted thereinto. The input fiber collimator 110a has a center axis, and the output fiber collimators 120a, 120b, 120c and 120d have respective center axes. The input fiber collimator 110a are positioned with respect to the output fiber collimators 120a, 120b, 120c and 120d in such a manner that the axis of the input fiber collimator 110a is substantially in parallel relationship with the axes of the output fiber collimators 120a, 120b, 120c and 120d The optical path switching apparatus 300 further comprises a plurality of light beam switching elements 310, 321, 322, 323 and 324 one of which is disposed in spaced and face-to-face relationship with the front end of the input fiber collimator 110a, and the others of which are respectively disposed in spaced and face-to-face relationship with the rear ends of the output fiber collimators 120a, 120b, 120c and 120d.

As will be seen from the following description, each of the light beam switching elements 310, 321, 322, 323 and 324 is identical in construction to the light beam switching element 210, 220, 230 and 240 forming part of the optical path switching apparatus 100 which has been described in the above.

Figure 4:
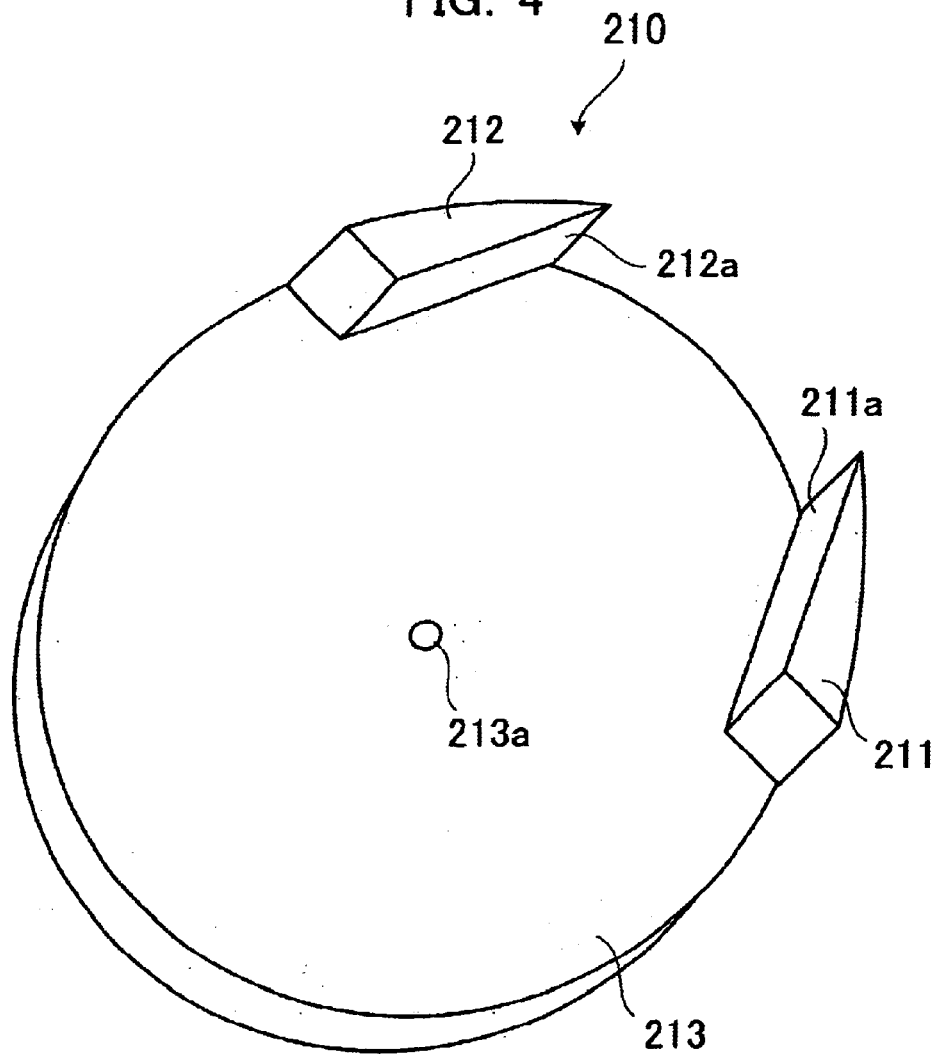
FIG. 4 is an enlarged perspective view of a support plate, a first reflection member, and a second reflection member securely mounted on the peripheral portion of the support plate.
Figure 5:
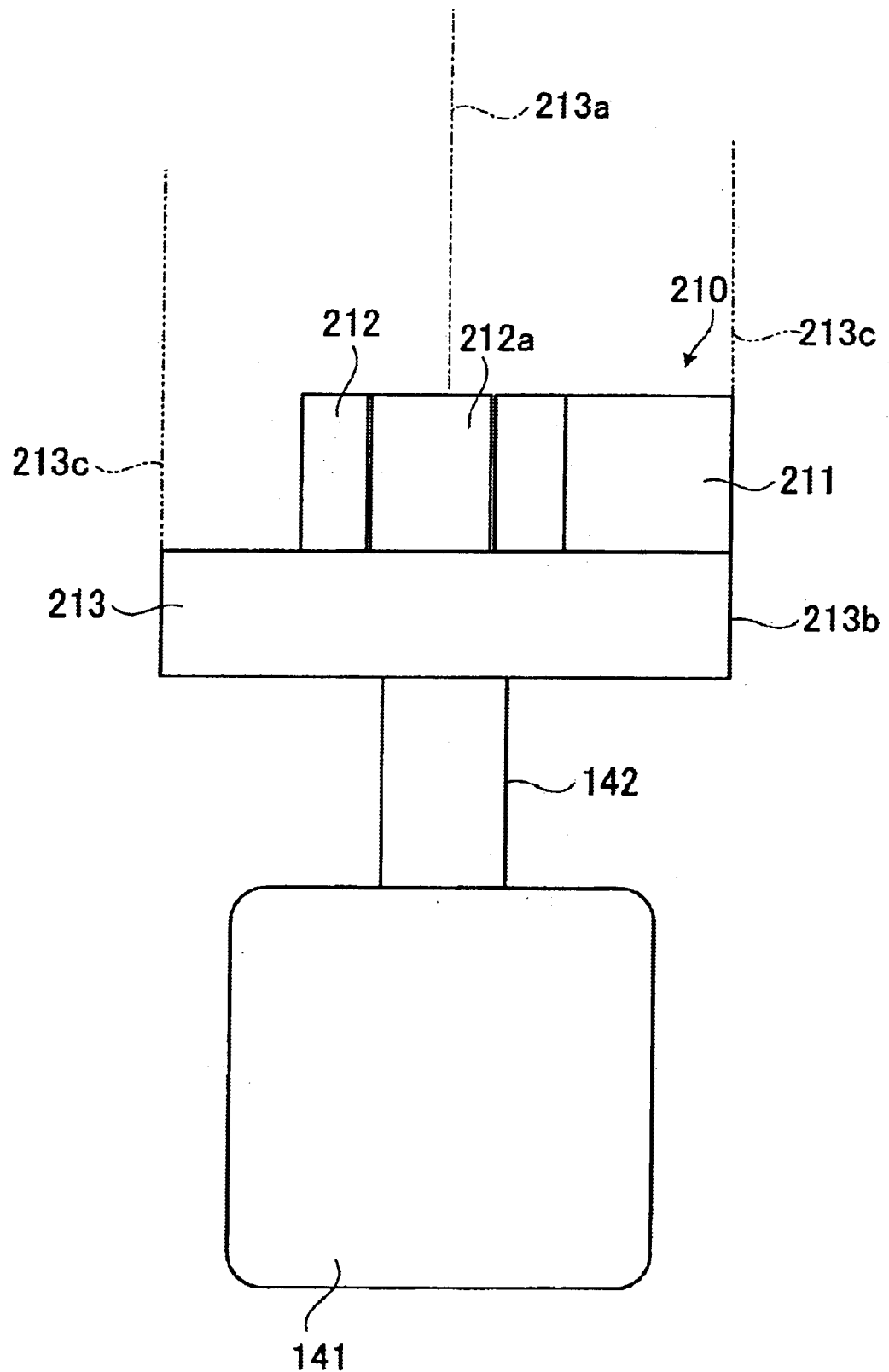
FIG. 5 is an enlarged elevation view of a drive actuator which is drivably connected to the support plate.

The light beam switching element 210 is shown in FIGS. 4 and 5 as comprising a support plate 213 in the form of a disc shape and fixedly supported by and in axial alignment with the rotation shaft 142 of the drive actuator 141 to be rotatable around its own center axis 213a, a first reflection member 211 securely mounted on the peripheral portion of the support plate 213 and having a reflection mirror surface 211a designed to reflect the light beam 101 from the optical path of the input fiber collimator 110a, and a second reflection member 212 also securely mounted on the peripheral portion of the support plate 213 and having a reflection mirror surface 212a also designed to reflect to the optical path of the output fiber collimator 120b the light beam 101 reflected by the reflection mirror surface 211a and 212a. The locations of the first and second reflection members 211 and 212 are such that the reflection mirror surfaces 211a and 212a are on a horizontal plane having the light beam 101 pass thereon, viz., on the optical path of the light beam 101 from the input fiber collimator 110a to the output fiber collimator 120b, and thus can reflect the light beam 101 from the input fiber collimator 110a to the output fiber collimator 120b. The support plate 213 is positioned in spaced relationship with the horizontal plane having the light beam 101 pass thereon and thus can allow the light beam 101 to pass from the input fiber collimator 110a to the output fiber collimator 120b.

The support plate 213 has an outer peripheral surface 213b, and an imaginary outer extension face 213c extending axially outwardly from the outer peripheral surface 213b. The imaginary outer extension face 213c is illustrated in phantom lines as best shown in FIG. 5. The first and second reflection members 211 and 212 have respective outer surfaces 211b and 212b and are disposed on the support plate 213 with the outer surfaces 211b and 212b of the first and second reflection members. 211 and 212 being within the imaginary outer extension face 213c of the support plate 213 and in symmetrical relationship with each other with respect to the center line "CL" passing through the center axis 213a of the support plate 213. The fact that the outer surfaces 211b and 212b of the first and second reflection members 211 and 212 is within the imaginary outer extension face 213c of the support plate 213 leads to the fact that the first and second reflection members 211 and 212 are not projected radially outwardly from the imaginary outer extension face 213c of the support plate 213, thereby making it possible to position the support plate 213 and the light beam switching element 210 in a relatively small space and in close proximity of one another while the first and second reflection members 211 and 212 is prevented from being brought into contact with one another when the support plate 213 is rotated. It will therefore be understood that the overall size of the optical path switching apparatus can be small together with the input and output fiber collimators being easy to be disposed also in close proximity of one another.

The reflection mirror surfaces 211a and 212a of the first and second reflection members 211 and 212 are in spaced and opposing relationship with each other at an angle 210 of about 45 degrees so that the optical path of the input fiber collimator 110a is angled at about 90 degrees with respect to the optical path of the output fiber collimator 120b. This leads to the fact that the light beam 101 from the optical path of the input fiber collimator 110a can be reflected at an angle of about 90 degrees to the optical path of the output fiber collimator 120b by the respective mirror surfaces 213a and 134a of the first and second reflection members 211 and 212.

The drive actuator 141 forming part of the drive actuator array 140 are operative to have the support plate 213 to assume two different angular positions consisting of a reflection position and non-reflection position. When the support plate 213 is rotated to assume the reflection position as shown in the upper half of FIG. 3, the first and second reflection members 211 and 212 are positioned to allow the light beams 101 to be reflected by the reflection mirror surfaces 211a and 211b. When the support plate 213, on the other hand, is rotated to assume the non-reflection position as shown in the lower half of FIG. 3, the first and second reflection members 211 and 212 are positioned to allow the light beams 101 to pass on the support plate 213 between the reflection mirror surfaces 211a and 211b without being reflected by the reflection mirror surfaces 211a and 211b.

The operation of the second embodiment of the optical switching apparatus according to the present invention will be described hereinafter.

While the forgoing description has been directed to the face that the first embodiment of the optical path switching apparatus comprises a plurality of input fiber collimators and a plurality of output fiber collimators, the optical path switching apparatus according to the present invention may comprise an input fiber collimator and a plurality of output fiber collimators as shown in FIG. 8.

The second embodiment of the optical path switching apparatus is shown in FIG. 8 to bear a reference numeral 300 and comprises an input fiber collimator 110a having a light beam pass therethrough and having a front end from which the light beam is ejected to the outside thereof, and a plurality of output fiber collimators 210a, 210b, 210c and 210d having the light beams pass therethrough and having respective rear ends from which the light beams ejected from the input fiber collimator 110a are inputted thereinto. The input fiber collimator 110a has a center axis, and the output fiber collimators 210a, 210b, 210c and 210d have respective center axes. The input fiber collimator 110a is positioned with respect to the output fiber collimators 210a, 210b, 210c and 210d in such a manner that the axis of the input fiber collimator 110a is substantially in parallel relationship with the axes of the output fiber collimators 210a, 210b, 210c and 210d.

The optical path switching apparatus 300 further comprises a light beam switching element 310 disposed in spaced and face-to-face relationship with the front end of the input fiber collimator 110a, and a light beam switching element array 320 which includes a plurality of light beam switching elements 321, 322, 323 and 324 respectively disposed in spaced and face-to-face relationship with the rear ends of the output fiber collimators 210a, 210b, 210c and 210d. Each of the light beam switching elements 310, 321, 322, 323 and 324 is identical in construction to the light beam switching element 210 forming part of the first embodiment of the optical path switching apparatus 100 which has been described in the above.

The following description will be directed to the operation that the light beam discharged from the input fiber collimator 110a is selectively inputted into the output fiber collimators 120a, 120b, 120c and 120d through the light beam switching elements 310, 321, 322, 323 and 324.

In the second embodiment of the optical path switching apparatus 300 shown in FIG. 8, the light beam switching elements 310 and 323 are respectively driven to rotate by the drive actuators 141 to assume the respective reflection positions while the raining light beam switching elements 321, 322 and 324 are not driven to rotate by the drive actuators 141 to assume the respective non-reflection positions. Under these conditions, the light beam discharged from the input fiber collimator 110a in a first direction shown by an arrow 301 is inputted into the output fiber collimator 120a and 120c in a second direction shown by an arrow 302 opposite to the arrow 301 through the light beam switching elements 310 and 323. If one of the light beam switching elements 321, 322, 323 and 324 in this embodiment is properly selected, the light beam discharged from the input fiber collimator 100a is inputted through the light beam switching element 310 and the selected light beam switching element 321, 322, 323 or 324 into one of the output fiber collimators 120a, 120b, 120c and 120d positioned in spaced and face-to-face relationship with the selected light beam switching element 321, 322, 323 or 324. This means that one of the light beam switching elements 321, 322, 323 and 324 properly selected in this manner causes the light beam discharged from the input fiber collimator 110a to be inputted through one of the light beam switching elements 321, 322, 323 and 324 selectively into the output fiber collimators 120a, 120b, 120c and 120d, thereby making it possible for the light beam switching elements 321, 322, 323 and 324 to selectively switch the light beam from the input fiber collimator 110a to the output fiber collimators 120a, 120b, 120c and 120d.

It is therefore understood from the foregoing description that the light beam switching elements 321, 322, 323 and 324 can selectively switch the light beam from the input fiber collimator 110a to the output fiber collimators 120a, 120b, 120c and 120d.

Figure 9:
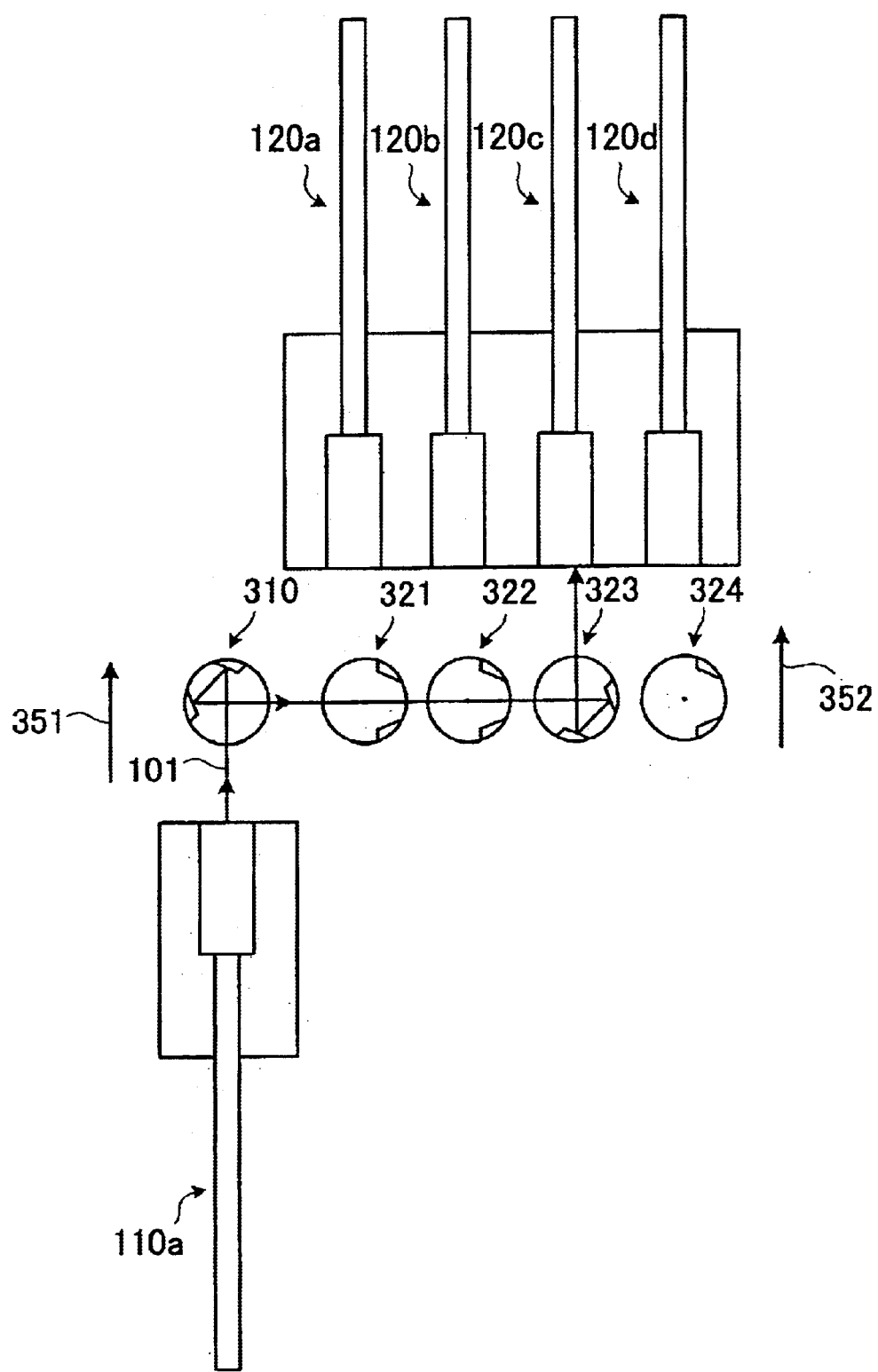
FIG. 9 is a plan view of a third embodiment of an optical path switching apparatus according to the present invention.
Figure 10:
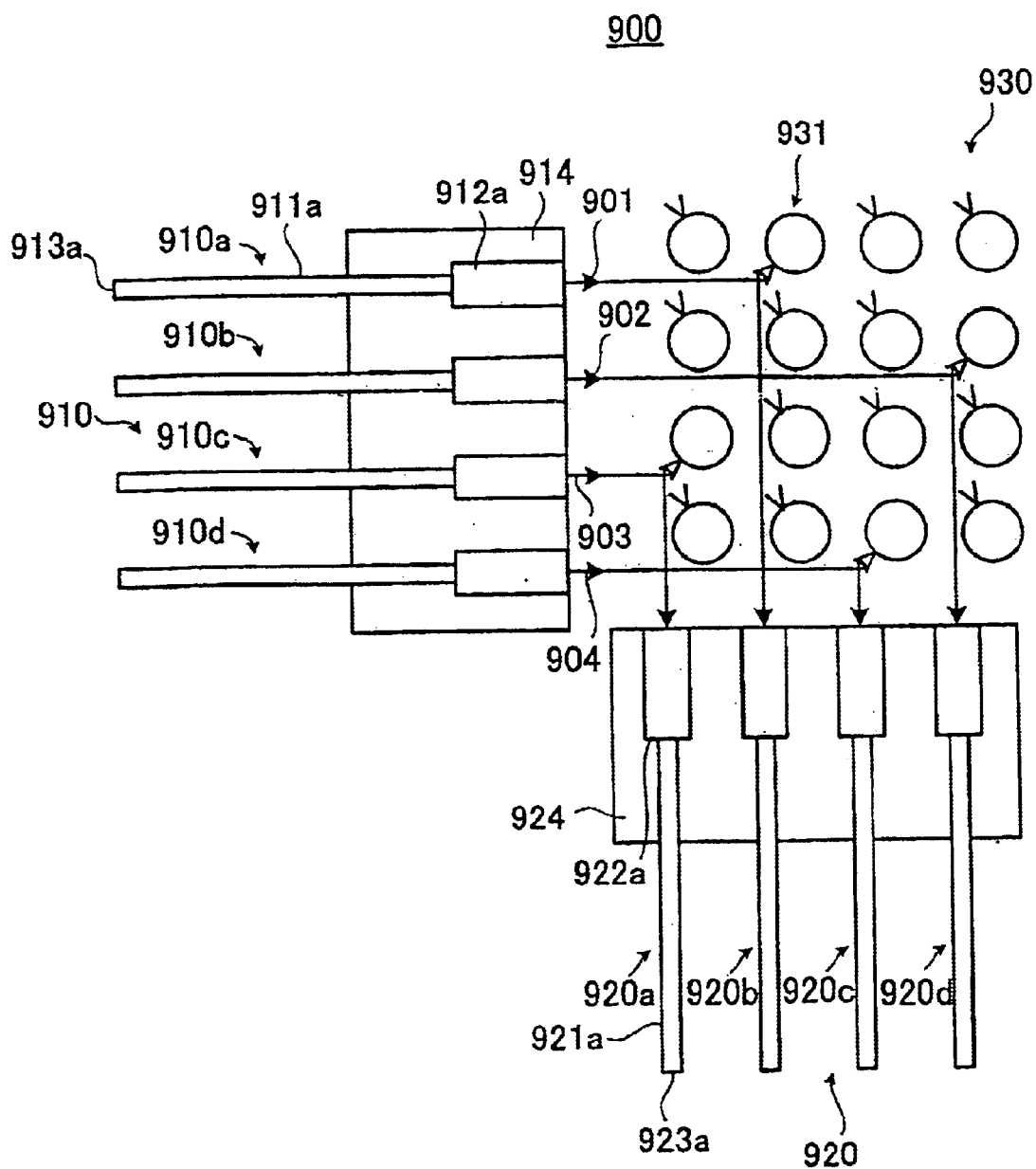
FIG. 10 is a plan view of a conventional optical path switching apparatus.
Figure 11:
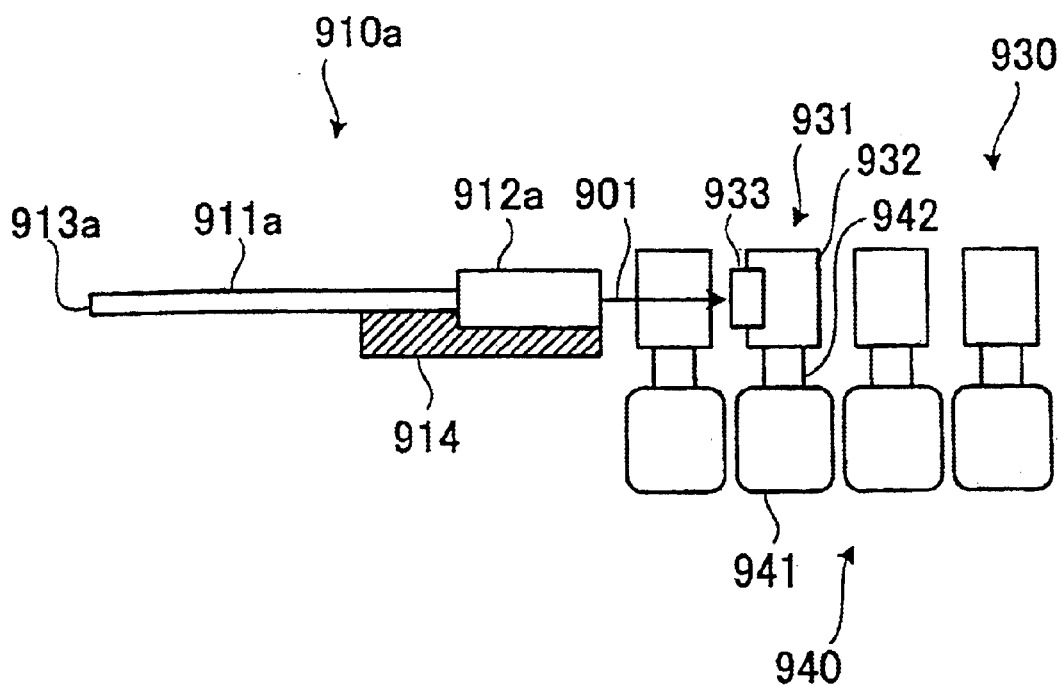
FIG. 11 is an elevation view of the conventional optical path switching apparatus.
Figure 12:
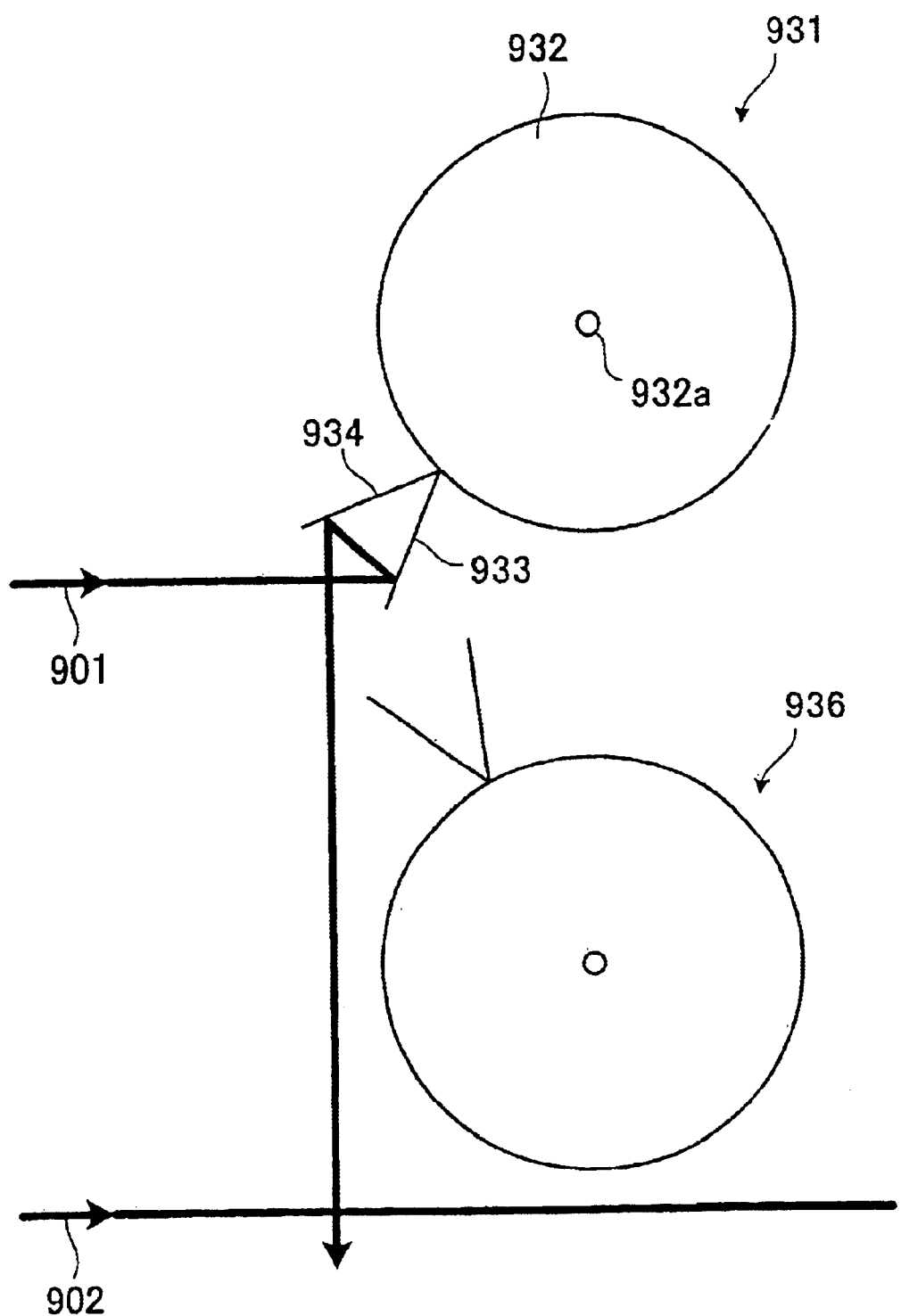
FIG. 12 is an enlarged plan view of reflection mirrors forming part of the conventional optical switching apparatus and showing how the light beams are reflected by the reflection mirrors.
Figure 13:
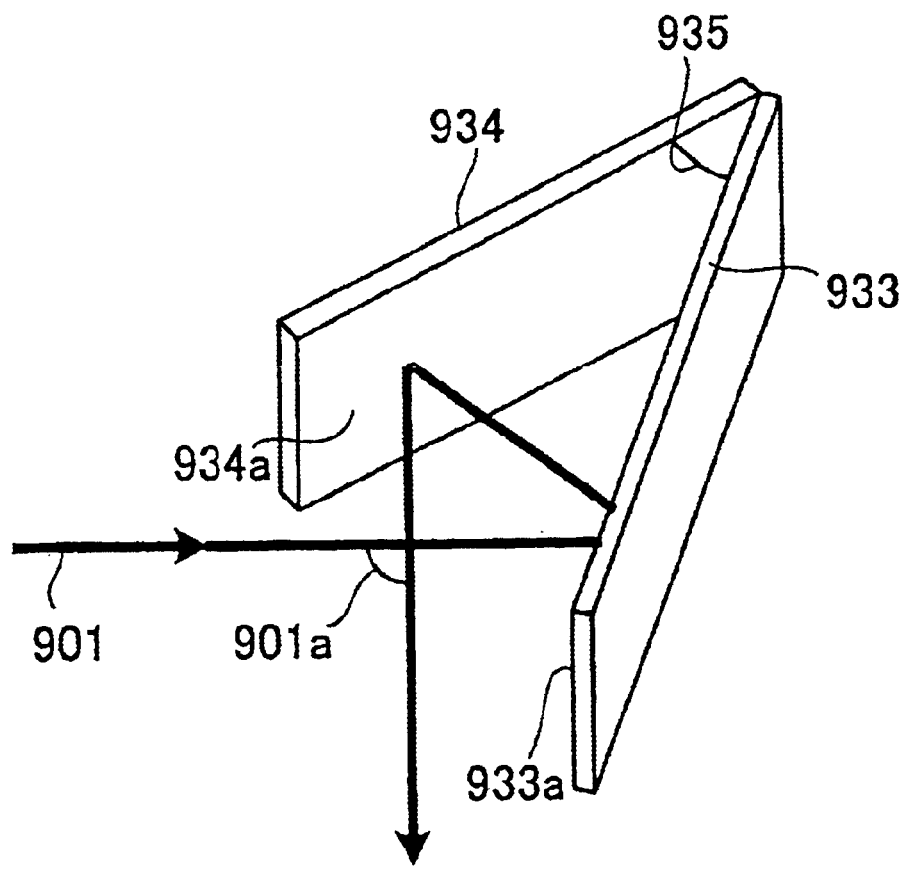
FIG. 13 is an enlarged perspective view of the reflection mirrors and showing how the light beams are reflected by the reflection mirrors.

In the second embodiment of the optical path switching apparatus according to the present invention, the input fiber collimator 110a, and the output fiber collimators 120a, 120b, 120c and 120d are arranged with respect to the light beam switching elements 321, 322, 323 and 324 in such a manner that the front end of the input fiber collimator 110a and the rear ends of the output fiber collimators 120a, 120b, 120c and 120d are in spaced and face-to-face relationship with the light beam switching elements 321, 322, 323 and 324 to have the light beam discharged from the input fiber collimator 110a turn in reversed direction with the light beams of the output fiber collimators 120a, 120b, 120c and 120d, however, the optical path switching apparatus according to the present invention may comprise an input fiber collimator 110a, a plurality of output fiber collimators 120a, 120b, 120c and 120d, and a plurality of light beam switching elements 321, 322, 323 and 324 disposed between the input fiber collimator 110a and the output fiber collimators 120a, 120b, 120c and 120d with the center axis of the input fiber collimator 110a being in parallel relationship with the axes of the output fiber collimators 120a, 120b, 120c and 120d to have the light beam discharged from the input fiber collimator 110a in a first direction shown by an arrow 351 advance in cranked relationship with the light beams of the output fiber collimators 120a, 120b, 120c and 120d in a second direction shown by an arrow 352 in parallel relationship to the arrow 351, through the light beam switching elements 321, 322, 323 and 324 as will be seen from the third embodiment of the optical path switching apparatus shown in FIG. 9 to bear a reference numeral 350.

The construction of the third embodiment of the optical path switching apparatus 350 is almost the same as that of the second embodiment of the optical path switching apparatus except for the construction described in the above. However, the construction elements 321, 322, 323 and 324 of the second embodiment of the optical path switching apparatus the same as those of the second embodiment of the optical path switching apparatus bear the respective reference numerals the same as those of the first embodiment of the optical path switching apparatus and will be omitted in description thereof.

As will be understood from the previously mentioned description, the fact that the first and second reflection members are securely mounted on the peripheral portion of the support plate within said extension plane of said support member leads to the face that the first and second reflection members are not projected radially outwardly from the imaginary outer extension face of the support plate, thereby making it possible to position the support plate and the light beam switching element in a relatively small space and in close proximity of one another while the first and second reflection members are prevented from being brought into contact with one another when the support plate is rotated. It will therefore be understood that the overall size of the optical path switching apparatus can be small together with the input and output fiber collimators being easy to be disposed also in close proximity of one another.

What is claimed is:

1. An optical path switching apparatus, comprising:
   an input fiber collimator allowing a light beam to pass therethrough;
   a plurality of output fiber collimators each allowing said light beam to pass therethrough, and
   a light beam switching element disposed between said input fiber collimator and said output fiber collimators and operative to selectively switch said light beam from said input fiber collimator to said output fiber collimators,
   said light beam switching element including a support member having a rotation axis, a peripheral surface and an extension face extending from said peripheral surface in parallel relationship with said rotation axis, a first reflection member securely mounted on the peripheral portion of said support member within said extension face of said support member, and a second reflection member securely mounted on the peripheral portion of said support member within said extension face of said support member, said first reflection member having a first reflection mirror surface designed to reflect said light beam from said input fiber collimator, said second reflection member having a second reflection mirror surface designed to reflect said light beam reflected by said first reflection mirror surface of said first reflection member, said first reflection mirror surface and said second reflection mirror surface being in spaced and opposing relationship with each other so that said light beam from said input fiber collimator to said first reflection mirror surface is biased by said first and second reflection mirror surfaces at an angle of about 90 degrees, and
   a drive actuator for selectively driving said support members to allow said light beam switching element to assume two different rotation positions including a first rotation position in which said light beam from said input fiber collimator is reflected by said first and second mirror surfaces of said first and second reflection members, and a second rotation position in which said light beam from said input fiber collimator passes between said first and second reflection members without being reflected by said first and second mirror surfaces of said first and second reflection members.

2. An optical path switching apparatus as set forth in claim 1 in which said light beam discharged from said input fiber collimator has a center axis, and said light beam inputted into one of said output fiber collimators has a center axis, said center axis of said light beam discharged from said input fiber collimator and said center axis of said light beam inputted into one of said output fiber collimators being substantially in parallel relationship to each other.

3. An optical path switching apparatus as set forth in claim 1 in which said first reflection mirror surface of said first reflection member and said second reflection mirror surface of said second reflection member are substantially at an angle of 45 degrees.

4. An optical path switching apparatus as set forth in claim 1 in which said first reflection mirror surface of said first reflection member and said second reflection mirror surface of said second reflection member are in symmetrical relationship with each other with respect to the center line passing through said rotation axis of said support member.

5. An optical path switching apparatus, comprising:
a plurality of input fiber collimators for respectively allowing a light beam to pass therethrough;
a plurality of output fiber collimators for respectively allowing said light beam to pass therethrough, and
a plurality of light beam switching elements respectively disposed between said input fiber collimators and said output fiber collimators and each operative to switch said light beam from one of said input fiber collimators to said output fiber collimators,
each of said light beam switching elements including a support member having a rotation axis, a peripheral surface, and an extension face extending from said peripheral surface in parallel relationship with said rotation axis, and a first reflection member securely mounted on the peripheral portion of said support member within said extension face of said support member, and a second reflection member securely mounted on the peripheral portion of said support member within said extension face of said support member, said first reflection member having a first reflection mirror surface designed to reflect said light beam from said input fiber collimator, said second reflection member having a second reflection mirror surface designed to reflect said light beam reflected by said first reflection mirror surface of said first reflection member, said first reflection mirror surface and said second reflection mirror surface being in spaced and opposing relationship with each other so that said light beam from said input fiber collimator to said first reflection mirror surface is biased by said first and second reflection mirror surfaces at an angle of about 90 degrees, and
a drive actuator for selectively driving said support members to allow each of said light beam switching elements to assume two different rotation positions including a first rotation position in which said light beam from one of said input fibers collimator is reflected by said first and second mirror surfaces of said first and second reflection members, and a second rotation position in which said light beam from one of said input fiber collimators passes between said first and second reflection members without being reflected by said first and second mirror surfaces of said first and second reflection members.

6. An optical path switching apparatus, comprising:
an input fiber collimator allowing a light beam to pass therethrough;
a plurality of output fiber collimators each allowing said light beam to pass therethrough, and
a plurality of light beam switching elements respectively disposed between said input fiber collimator and said output fiber collimators and each operative to selectively switch said light beam from said input fiber collimator to said output fiber collimators,
each of said light beam switching elements including a support member having a rotation axis, a peripheral surface and an extension face extending from said peripheral surface in parallel relationship with said rotation axis, a first reflection member securely mounted on the peripheral portion of said support member within said extension face of said support member, and a second reflection member securely mounted on the peripheral portion of said support member within said extension face of said support member, said first reflection member having a first reflection mirror surface designed to reflect said light beam from said input fiber collimator, said second reflection member having a second reflection mirror surface designed to reflect to said output fiber collimator said light beam reflected by said first reflection mirror surface of said first reflection member, and
a drive actuator for selectively driving said support members to allow each of said light beam switching elements to assume two different rotation positions including a first rotation position in which said light beam from said input fiber collimator is reflected by said first and second mirror surfaces of said first and second reflection members, and a second rotation position in which said light beam from said input fiber collimator is allowed to pass between said first and second reflection members without being reflected by said first and second mirror surfaces of said first and second reflection members,
wherein said light beam discharged from said input fiber collimator has a center axis, and said light beam inputted into one of said output fiber collimators has a center axis, said center axis of said light beam discharged from said input fiber collimator and said center axis of said light beam inputted into one of said output fiber collimators being substantially at an angle of 90 degrees with respect to each other.

7. An optical path switching apparatus, comprising:
a plurality of input fiber collimators each allowing a light beam to pass therethrough;
a plurality of output fiber collimators each allowing said light beam to pass therethrough, and
a plurality of light beam switching elements respectively disposed between said input fiber collimators and said output fiber collimators and each operative to selectively switch said light beam from one of said input fiber collimators to said output fiber collimators;
each of said light beam switching elements including a support member having a rotation axis, a peripheral surface and an extension face extending from said peripheral surface in parallel relationship with said rotation axis, and a first reflection member securely mounted on the peripheral portion of said support member within said extension face of said support member, and a second reflection member securely mounted on the peripheral portion of said support member within said extension face of said support member, said first reflection member having a first reflection mirror surface designed to reflect said light beam from said input fiber collimator, said second reflection member having a second reflection mirror surface designed to reflect to said output fiber collimator said light beam reflected by said first reflection mirror surface of said first reflection member, and
a drive actuator for selectively driving said support members to allow each of said light beam switching elements to assume two different rotation positions including a first rotation position in which said light beam from one of said input fiber collimators is reflected by said first and second mirror surfaces of said first and second reflection members, and a second rotation position in which said light beam from one of said input fiber collimators passes between said first and second reflection members without being reflected by said first and second mirror surfaces of said first and second reflection members, wherein said light beam discharged from one of said input fiber collimators has a center axis, and said light beam inputted into one of said output fiber collimators has a center axis, said center axes of said light beam discharged from one of said input fiber collimators and said center axis of said light beam inputted into one of said output fiber collimators being substantially at an angle of 90 degrees with respect to each other.

* * * * *